United States Patent

Möllenbeck et al.

[15] 3,663,957
[45] May 16, 1972

[54] MAGNETO-OPTICAL MODULATOR MEANS FOR MEASURING CURRENTS IN HIGH VOLTAGE CONDUCTORS WITH RANGE CHANGING FEATURES

[72] Inventors: Klaus Möllenbeck; Joachim Bensel, both of Berlin, Germany

[73] Assignee: Siemens Aktiengesellschaft, Berlin, Munich, Germany

[22] Filed: June 19, 1970

[21] Appl. No.: 47,712

[30] Foreign Application Priority Data

June 24, 1969 Germany..................P 19 33 044.0

[52] U.S. Cl.................................324/96, 340/189, 250/199
[51] Int. Cl........................................................G01r 31/00
[58] Field of Search..............324/96; 340/189, 190; 250/199

[56] References Cited

UNITED STATES PATENTS 3,492,574   1/1970   Heintz et al............................340/190

Primary Examiner—Rudolph V. Rolinec
Assistant Examiner—R. J. Corcoran
Attorney—Curt M. Avery, Arthur E. Wilfond, Herbert L. Lerner and Daniel J. Tick

[57] ABSTRACT

A magneto-optical modulator at high voltage potential rotates the plane of polarization of light supplied thereto in accordance with the magnitude of a current to be measured. The modulator comprises a core component and a field winding wound around a core component for rotating the plane of polarization of light supplied to the core component. The field winding comprises a plurality of component windings thereby providing a wide range of measurement. Switches interconnect the component windings of the field winding of the modulator for varying the number of component windings connected in circuit thereby varying the magnetic field produced thereby in the manner of an independent measuring range switch in accordance with the magnitude of the current to be measured. A photoelectric evaluating circuit converts light passing through the core component of the modulator into an electrical quantity proportional to the current to be measured. The photoelectric evaluating circuit includes another winding comprising a plurality of component windings for coupling the load to the measuring device thereby providing a range switch of low voltage potential corresponding to the measuring range switch at high voltage potential.

13 Claims, 3 Drawing Figures

MAGNETO-OPTICAL MODULATOR MEANS FOR MEASURING CURRENTS IN HIGH VOLTAGE CONDUCTORS WITH RANGE CHANGING FEATURES

DESCRIPTION OF THE INVENTION

The invention relates to a current measuring device. More particularly, the invention relates to a measuring device for currents in high voltage conductors.

In the measuring device of the invention, a light emitted by a light source is supplied at low voltage potential and after polarization is transmitted to a magneto-optical modulator maintained at a high voltage potential. The polarization plane of the light is then rotated, in accordance with the intensity of the current to be measured. After the rotation of the polarization plane of the light, said light is converted in an evaluation circuit maintained at low voltage potential, and having an amplifier, into an electrical measured quantity which is proportional to the current being measured. The measuring device of the invention thus utilizes a magneto-optical transformer which does not operate in accordance with the transformer principle, wherein the magnitude of rotation of the polarization plane of a linearly polarized light beam constitutes a measure of the magnitude of the current to be measured.

If the measuring device of the invention is to be utilized instead of a known type of transformer, said measuring device must satisfy the requirements of known current transformers. The measuring device must be able to transmit, for example, currents having a magnitude of 0.05 of the rated current up to 100 times the magnitude of the rated current. The measurement of such a range of magnitudes within a single range of measurement entails, in a measuring device of this type, considerable output efficiency with regard to the amplifier provided in the photoelectric evaluating circuit, which is maintained at low voltage potential and which provides the current for a reproduction of the current flowing at the high voltage part. If the amplifier includes only one amplifier, it is safe to assume that its linearity would be poorly safeguarded. Furthermore, operation may be provided by maintaining certain error limits only in the linear range of the intensity distribution curve of the polarized light. Thus, a range of measurement which encompasses more than 3 powers of 10 is not expected to provide measurement at the desired accuracy.

To eliminate these difficulties, and to provide a novel magneto-optical current transformer having a relatively wide range of measurement, it has been suggested that a device for measuring a current which flows in a conductor at high potential where the measured value is provided by magneto-optical assistance in each measuring range, with a modulator maintained at a high potential and another modulator maintained at a low voltage potential, be provided with a measuring system which includes an evaluating device. Accordingly, a range of measurement divided into three sub-ranges must be provided with three measuring systems which make the output of the known device rather large.

The principal object of the invention is to provide a new and improved measuring device for currents in high voltage conductors.

An object of the invention is to provide a measuring device for currents in high voltage conductors which functions with accuracy and reliability.

An object of the invention is to provide a measuring device for currents in high voltage conductors which functions with efficiency, effectiveness and reliability.

An object of the invention is to provide a measuring device for currents in high voltage conductors which overcomes the disadvantages of known similar types of device.

In accordance with the invention, the measuring device for currents in high voltage conductors provides a division of the field winding, which produces the magnetic field and which provides the rotation of the polarization plane of the light in a magneto-optical modulator at high voltage potential, into a plurality of component windings in order to provide a wide range of measurement.

The plurality of component windings are fully or partially effective in producing a magnetic field of the type of an independent measuring range switch, in accordance with the order of magnitude of the current to be measured. Furthermore, in order to provide a measuring range switch at low voltage potential which corresponds to a measuring range switch at high voltage potential, the photoelectric evaluating device is provided with another winding comprising a plurality of component windings, through which a load is connected to the measuring device.

Thus, in the measuring device of the invention, the expansion of the range of measurement is not provided by utilizing a plurality of measuring systems having one modulator at high voltage potential and another modulator at low voltage potential, but operates with a single measuring system by varying the influence of the high voltage part modulator via an appropriate measuring range switch to low voltage potential via another winding comprising changeover component windings.

The measuring device of the invention may be designed differently for low voltage potential with regard to the evaluation of the rotation of the polarization plane of the light produced at high voltage potential in accordance with the intensity of the current to be measured. Thus, for example, a photocell, photosensitive cell, photoresponsive cell or photocell is connected in series to a light analyzer at low voltage potential and is directly connected to the amplifier of the evaluating device. Thus, a current delivered to a load by the amplifier is proportional to the rotation of the polarization plane of the light at high voltage potential, and this also corresponds to the current to be measured.

The low voltage part of the measuring device of the invention includes the photoelectric evaluating device at low voltage potential. The photoelectric evaluating device includes another magneto-optical modulator wherein, in accordance with the type of compensation process, the rotation of the polarization plane of the light produced in the magneto-optical modulator at high voltage potential is cancelled. In such a photoelectric evaluating device, the current which provides the return rotation of the polarization plane of the light, also flows through the load, which may be compared to the load of a usual current transformer.

In order to avoid disturbing influences such as, for example, aging, of the light source which supplies the light to be polarized, a beam divider may be utilized, at the magneto-optical modulator maintained at low voltage potential and connected in series with two photocells. Both photocells provide outputs which are supplied to respective inputs of a difference amplifier. The output of the difference amplifier is connected to the load and to the winding of the other magneto-optical modulator.

The measuring device of the invention may be utilized to measure currents in high voltage conductors where the light emitted by the light source is split into two light beams, one of which is supplied, via a modulator at low voltage potential, to a photocell. The other light beam is supplied, via a modulator at high voltage potential, to another photocell of the photoelectric evaluating device.

The structure and arrangement of of the additional winding at low voltage potential may be provided in a number of different embodiments. Thus, for example, the winding having component windings may constitute the secondary winding of an auxiliary transformer. The primary winding of the auxiliary transformer is connected to the output of the amplifier of the photoelectric evaluating device. In this arrangement, the amplifier comprises one amplifier stage.

The additional winding at low voltage potential may be designed as a field winding which produces the magnetic field of the other magneto-optical modulator at low voltage potential. An amplifier is then provided for the additional winding, in the amplifier of each component winding.

The measuring range switch utilized in the measuring device of the invention in order to provide a wide range of measurement is preferably provided by circuit or switching components of variable current sensitivity. The circuit or switching components control the measuring range switch of the high voltage part by interconnecting selected ones or all of the component windings of the field winding of the magneto-optical modulator. This means that, for a current to be measured having an intensity which lies in the lowest measuring range, all the component windings are switched in series by the switching members, so that all the component windings contribute toward the production of the magnetic field for the magneto-optical modulator at high voltage potential. When the measurement lies in the highest measuring range, only a single component winding is switched into the circuit by the switching member. Thus, due to the small number of windings, the ampere-turns in such a case coincide approximately with those of the currents of the lowest measuring range. This insures that even in the highest measuring range there is only such rotation of the polarization plane of the light as provides, at low voltage potential, a good control for the series-connected amplifier, after the conversion of the light into an electrical magnitude or current.

Since currents of variable magnitude flow through the individual component windings at variable intensities of the current to be measured, it is preferable to provide corresponding cross-sections of the conductors of the individual component windings.

The switching or reversal of the measuring range switch at high voltage potential in order to provide a wider range of measurement must be correspondingly provided at the low voltage part. This may be accomplished in many different ways. Thus, for example, additional switching members of variable current sensitivity may be provided at the low voltage part. The additional switching members provide the measuring range switch at the low voltage part by interconnecting selected ones or all of the component windings of the secondary winding of the auxiliary transformer or field winding of the additional magneto-optical modulator. In this case, the switching members preferably comprise AC relays connected with shunt resistors in circuit with the corresponding winding. The interconnection of the component windings is preferably provided by self-wiping contacts or AC relays.

The switching members may also comprise electronic switches such as, for example, transistors, thyristors, especially Triacs, and the like, preferably primarily because the switchover from one range of measurement to the next is provided considerably more rapidly and without the necessity for contacts, when such switching members are utilized.

The switching of a measuring range from high voltage to low voltage potential may be provided in another manner wherein each switching member which is at high voltage potential is provided with a controllable optical connecting channel or conduit from the high voltage part to the low voltage part. This provides an interconnection of the component windings of the secondary winding of the auxiliary transformer of the field winding of the other magneto-optical modulator to permit switchover to low voltage potential, corresponding to the measuring range switch at the high voltage part, by a circuit device at low voltage potential which is provided for each optical channel or conduit.

It is preferable that each optical channel, duct, or conduit include a diaphragm controlled by the corresponding high voltage switching member. Each optical conduit transferably comprises a light conducting plurality of fibers which functions as an optical transfer medium. Each optical conduit includes a photocell which produces an electrical output signal for the circuit device. The light for the optical conduits is preferably derived from the light supplied to the magneto-optical modulator at high voltage potential.

In accordance with the invention, a measuring device for currents in high voltage conductors comprises magneto-optical modulator means at high voltage potential for rotating the plane of polarization of light supplied thereto in accordance with the magnitude of a current to be measured. The magneto-optical modulator means comprises a core component and a field winding wound around the core component for rotating the plane of polarization of light supplied to the core component. The field winding comprises a plurality of component windings for providing a wide range of measurement. Switching means interconnects the component windings of the field winding of the magneto-optical modulator means for varying the number of the component windings connected in circuit thereby varying the magnetic field produced thereby in the manner of an independent measuring range switch in accordance with the magnitude of the current to be measured. Photoelectric evaluating means converts light passing through the core component of the magneto-optical modulator means into an electrical quantity proportional to the current to be measured. The photoelectric evaluating means includes another winding comprising a plurality of component windings for coupling the load to the measuring device thereby providing a range switch to low voltage potential corresponding to the measuring range switch at high voltage potential.

The switching means comprises switching members having variable current sensitivity at high voltage potential. Input means supplies a current proportional to the current to be measured to the switching members. Switch contacts interconnect the component windings of the field winding of the magneto-optical modulator means and are controlled in position by the switching members thereby providing a high voltage measuring range switch. Additional switching means comprises additional switching members having variable current sensitivity at low voltage potential. Additional input means supplies a current proportional to the current to be measured to the additional switching members. Additional switch contacts interconnect the component windings of the other winding of the photoelectric evaluating means and are controlled in position by the additional switching members thereby providing a low voltage measuring range switch.

The switching members of the switching means and the additional switching members of the additional switching means comprise AC relays each connected in shunt with a resistor connected in circuit with the corresponding component winding. The switch contacts of the switching means and the additional switch contacts of the additional switching means comprise relay wiper contacts. The switching means and the additional switching means may comprise electronic switches.

The photoelectric evaluating means comprises additional magneto-optical modulator means at low voltage potential for rotating the plane of polarization of light supplied thereto from the magneto-optical modulator means at high voltage potential to cancel the previous rotation of the plane of polarization thereof. The photoelectric evaluating means further comprises amplifier means comprising an amplifier having an input coupled to the additional magneto-optical modulator means and an output and auxiliary transformer means having a primary winding connected to the output of the amplifier and a secondary winding. The other winding of the photoelectric evaluating means is the secondary winding of the auxiliary transformer means.

The additional magneto-optical modulator means comprises a core component and a field winding wound around the core component. The other winding of the photoelectric evaluating means is the field winding of the additional magneto-optical modulator means. The photoelectric evaluating means further comprises amplifier means comprising a plurality of amplifiers each having an input coupled to the additional magneto-optical modulator means and an output coupled to a corresponding one of the component windings of the other winding.

A controllable optical conducting conduit is provided for each of the switch members of the switching means. Each of the conducting conduits conducts light from the light supplied to the magneto-optical modulator means to a corresponding one of the additional switching members of the additional switching means thereby electrically controlling the connection of the component windings of the other winding of the photoelectric evaluating means and providing a low voltage measuring range switch corresponding to the high voltage measuring range switch via the additional switching means.

Each of the optical conducting conduits comprises a plurality of light conducting fibers for transmitting light and a diaphragm interposed therein and controlled in position by a corresponding one of the switching members of the switching means. The additional switching means further comprises photocells each positioned at a corresponding one of the conducting conduits and electrically connected to a corresponding one of the additional switching members of the additional switching means whereby each of the photocells controls the operation of a corresponding one of the additional switching members. Optical means directs light from the light supplied to the magneto-optical modulator means to each of the optical conducting conduits.

In order that the invention may be readily carried into effect, it will now be described with reference to the accompanying drawings, wherein.

Figure 1:
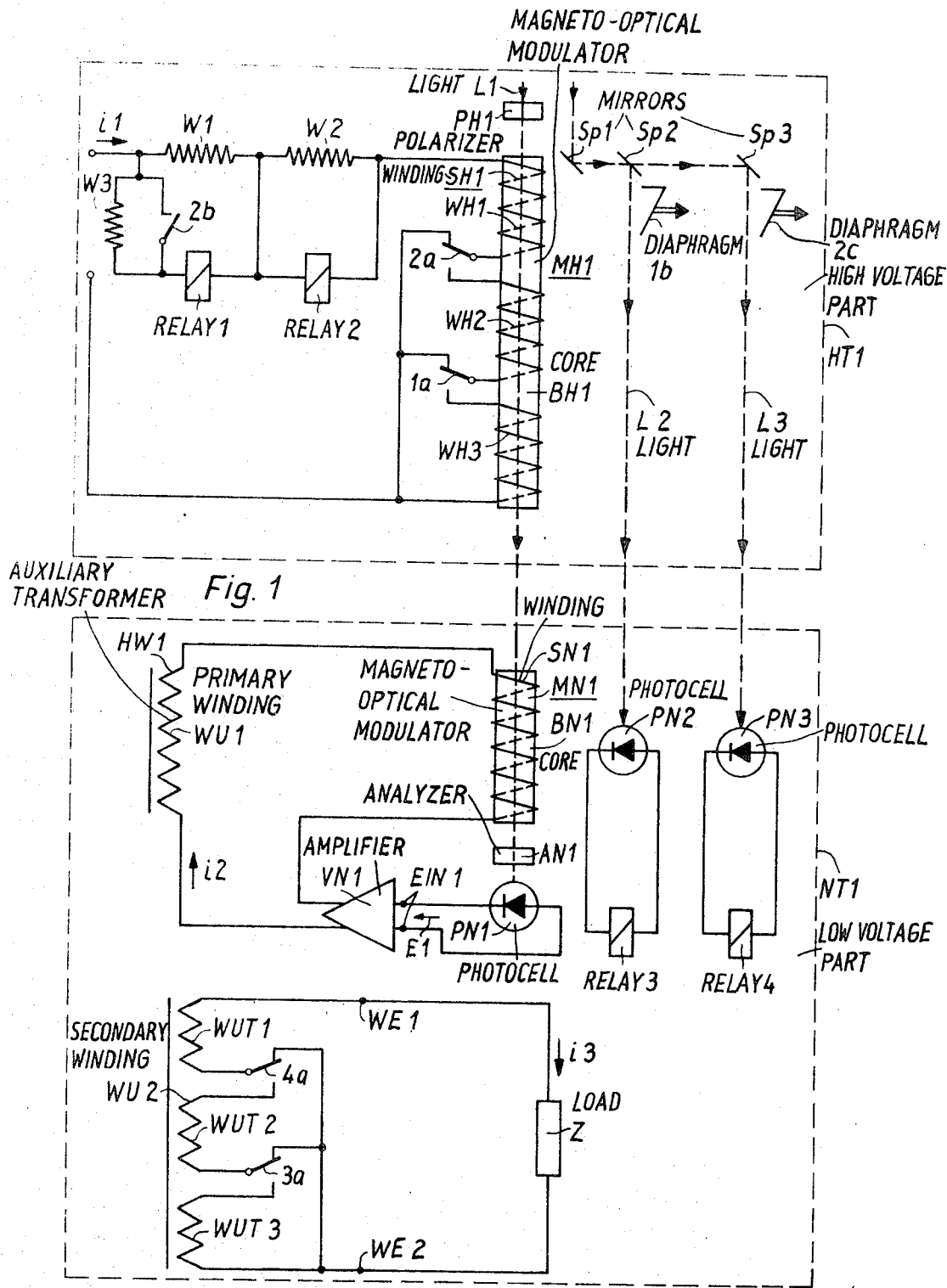
FIG. 1 is a circuit diagram of an embodiment of the measuring device of the invention for currents in high voltage conductors.

In the embodiment of FIG. 1, the measuring range switched at the high voltage part is transmitted to the low voltage part via a plurality of optical conduits, conductors, channels, ducts, or the like, corresponding in number to the possible switching arrangements. The embodiment of FIG. 2 differs from the embodiment of FIG. 1 primarily in the amplifier and the additional magneto-optical modulator. In the embodiment of FIG. 3, current-sensitive switching members are utilized to switch the range of measurement in the high voltage part and in the low voltage part.

In FIG. 1, the measuring device of the invention comprises a high voltage part HT1 and a low voltage part NT1. The high voltage part HT1 and the low voltage part NT1 are separated from each other by electrically insulating material and are included in the same structure. Neither the electrically insulating material nor the structure is shown in the FIGS., in order to maintain the clarity of illustration.

The core portion of the high voltage part HT1 comprises a magneto-optical modulator MH1 having a core component BH1 and a winding SH1 around said core component. The core component BH1 exhibits the Faraday effect and, along with the other components of each of the embodiments of the invention, comprises a known device. The winding SH1 of the magneto-optical modulator MH1 functions as the field winding of said magneto-optical modulator and comprises a plurality of component windings WH1, WH2 and WH3. The component windings WH1, WH2 and WH3 may be interconnected via the contacts 1a and 2a of AC relays 1 and 2, respectively.

The relay 1 controls the contact 1a, which contact is illustrated in its position when said relay is energized. When the relay 1 is deenergized, the contact 1a is in its position opposite that shown in FIG. 1. The relay 2 controls contacts 2a and 2b, which contacts are shown in their positions in which said relay is energized. When the relay 2 is deenergized, the contacts 2a and 2b are in their positions opposite those shown in FIG. 1.

The relay 1 is connected in shunt with a resistor W1. The relay 2 is connected in shunt with a resistor W2. The resistors W1 and W2 are connected in circuit with the winding SH1, and a current $i1$ flows through said resistors and said winding. The current $i1$ is proportional to the current in a high voltage line, not shown in the FIGS. A resistor W3 and the contact 2b of the relay 2 are connected in parallel. One of the shunt connections of the relay 1 extends through the parallel connection of the resistor W3 and the contact 2b.

A light beam L1 is supplied to the core component BH1 of the magneto-optical modulator MH1 via a polarizer PH1. The magneto-optical modulator MH1 functions in a known manner to rotate the plane of polarization of the light beam L1 in proportion to the magnetic field produced by the field winding SH1. The light beam, after the rotation of its plane of polarization in the high voltage part HT1, is applied to another magneto-optical modulator MN1 of the low voltage part NT1 of the measuring device of FIG. 1.

The additional magneto-optical modulator MN1 of the low voltage part NT1 is a known device and comprises a core component BN1 and a field winding SN1 wound around said core component. The core component BN1 functions in a known manner and exhibits the Faraday effect. After passing through the magneto-optical modulator MN1, the light beam L1 is supplied through an analyzer AN1 to a photocell PN1. The photocell is connected in series to the input of an amplifier VN1 and produces an electrical signal having a magnitude E1. The output signal E1 produced by the photocell PN1 is proportional to the rotation of the plane of polarization of the light in the magneto-optical modulator MH1 at high voltage potential, and is therefore also proportional to the current being measured.

The output signal produced by the photocell PN1 is supplied to the input EIN1 of the amplifier VN1. A primary winding WU1 of an auxiliary transformer HW1 is connected in series with the field winding SN1 of the additional magneto-optical modulator MN1 in the output circuit of the amplifier VN1. The auxiliary transformer HW1 has a secondary winding WU2 which comprises a plurality of component windings WUT1, WUT2 and WUT3. The number of component windings WUT1 to WUT3 is equal to the number of component windings of the field winding SH1 of the magneto-optical modulator MH1 at high voltage potential.

The component windings WUT1 to WUT3 of the secondary winding WU2 of the auxiliary transformer HW1 may be interconnected via contacts 3a and 4a. A relay 3 controls the position of the relay contact 3a, which is shown in FIG. 1 in its condition when said relay is energized. A relay 4 controls the position of the relay contact 4a. The relay contact 4a is shown in its position when the relay 4 is in its energized condition. When the relays 3 and 4 are deenergized, the contacts 3a and 4a are in their positions opposite to those shown in FIG. 1. A load Z is connected to the ends WE1 and WE2 of the secondary winding WU2 of the auxiliary transformer HW1. The relay 3 is connected in a closed loop with a photocell PN2 in the low voltage part NT1. The relay 4 is connected in a closed loop with a photocell PN3 in the low voltage part NT1. A light beam L2 from the high voltage part HT1 impinges upon the photocell PN2. A light beam L3 from the high voltage part HT1 impinges upon the photocell PN3.

A diaphragm 1b, controlled by the relay 1, in the high voltage part HT1 is positioned in the path of the light beam L2 and permits said light beam to pass to the low voltage part NT1 when said diaphragm is open. A diaphragm 2c, controlled by the relay 2, in the high voltage part HT1, is positioned in the path of the light beam L3 and permits said light beam to pass to the low voltage part NT1 when said diaphragm is open. The light beams L2 and L3 are derived from a single light beam by a plurality of mirrors Sp1, Sp2 and Sp3.

Since the diaphragm 1b is controlled in its position by the relay 1 and the diaphragm 2c is controlled in its position by the relay 2, when said relays are energized or respond, and the measuring range is switched to high voltage potential, corresponding signals are transmitted to the low voltage part NT1 via the light beams L2 and L3 through suitable light conductors, channels, conduits, ducts, and the like. The transmitted light beams L2 and L3 initiate an appropriate measuring range switch in the low voltage part NT1.

The measuring device of the embodiment of FIG. 1 operates as follows. When a current $i1$ of relatively low intensity, so that it is in the lowest measuring range, is supplied to the high voltage part HT1, both relays 1 and 2 remain deenergized, so that the relay contacts 1a, 2a and 2b are all in their positions opposite those shown in FIG. 1. The component windings WH1, WH2 and WH3 of the field winding SH1 of the magneto-optical modulator MH1 are connected in series via the relay contacts 1a and 2a. The current $i1$ therefore flows through the component windings WH1, WH2 and WH3, in common.

Since the relays 1 and 2 are deenergized, the diaphragms 1b and 2c, controlled by said relays, are in their closed positions, so that no light is transmitted to the photocells PN2 and PN3 of the low voltage part NT1. The relays 3 and 4, connected to the photocells PN2 and PN3, respectively, are therefore deenergized. The load Z is thus connected to all the component windings WUT1, WUT2 and WUT3 of the secondary winding WU2 of the auxiliary transformer HW1, since the relay contacts 3a and 3b are in their positions opposite those shown in FIG. 1.

The light, the polarization plane of which is rotated in accordance with the magnitude of the current to be measured, is transmitted from the magneto-optical modulator MH1 to the additional magneto-optical modulator MN1. The light from the additional magneto-optical modulator MN1 is transmitted to the photocell PN1 via the analyzer AN1. The output signal produced by the photocell PN1 controls the amplifier VN1 in a manner whereby said amplifier directs a current $i2$ through the primary winding WU1 of the auxiliary transformer HW1 and the field winding SN1 of the additional magneto-optical modulator MN1. The current $i2$ cancels the rotation of the plane of polarization of the light transmitted from the high voltage part HT1. The current $i2$, which flows through the primary winding WU1 of the auxiliary transformer HW1 is a measure of the current $i1$ at high voltage potential and is supplied to the load Z as a current $i3$, via the component windings WUT1, WUT2 and WUT3 of the secondary winding WU2 of said auxiliary transformer.

When the current $i1$, supplied to the high voltage part HT1, has a greater magnitude, the relay 1 responds first and is energized. When the relay 1 is energized, it moves the relay contact 1a to its position shown in FIG. 1, and thereby disconnects the component winding WH3 of the field winding SH1 from the circuit. This helps to maintain the ampere-turns of the magneto-optical modulator MH1 within preferred limits. The relay 1, when energized, moves the diaphragm 1b to its open position, so that the light beam L2 is transferred to, and impinges upon, the photocell PN2.

When the light beam L2 impinges upon the photocell PN2, the relay 3 is energized. When the relay 3 is energized, it moves its contact 3a to its position shown in FIG. 1, so that the component winding WUT3 of the secondary winding WU2 of the auxiliary transformer HW1 is disconnected from the circuit. Despite the approximately equal magnitude current $i2$ in the primary circuit of the auxiliary transformer HW1, a correspondingly higher magnitude current $i3$ flows through the load Z, due to the measuring range switch. The current $i3$ is a measure of the current $i1$ at high voltage potential.

Similarly, the component winding WUT2 of the secondary winding WU2 of the auxiliary transformer HW1 is also disconnected during an additional increase in the magnitude of the current $i1$. This is due to the energization of the relay 2 and the moving of the relay contact 4a to its position shown in FIG. 1, so that the component winding WUT2, as well as the component winding WUT3, is disconnected from the circuit. Thus, even when the current $i1$ at high voltage potential is in the highest measuring range, the current $i3$ flowing through the load Z is proportional to the current $i1$.

Figure 2:
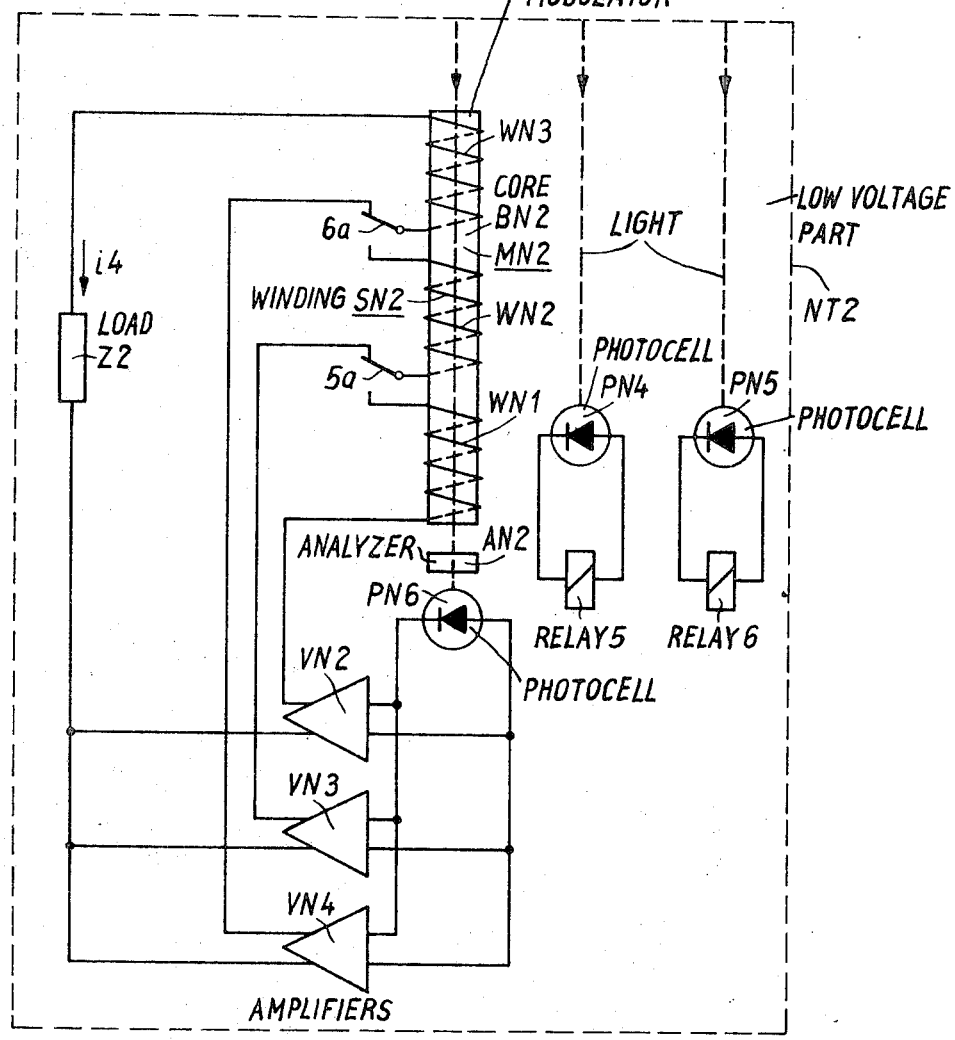
FIG. 2 is a circuit diagram of part of another embodiment of the measuring device of the invention for currents in high voltage conductors.
Figure 3:
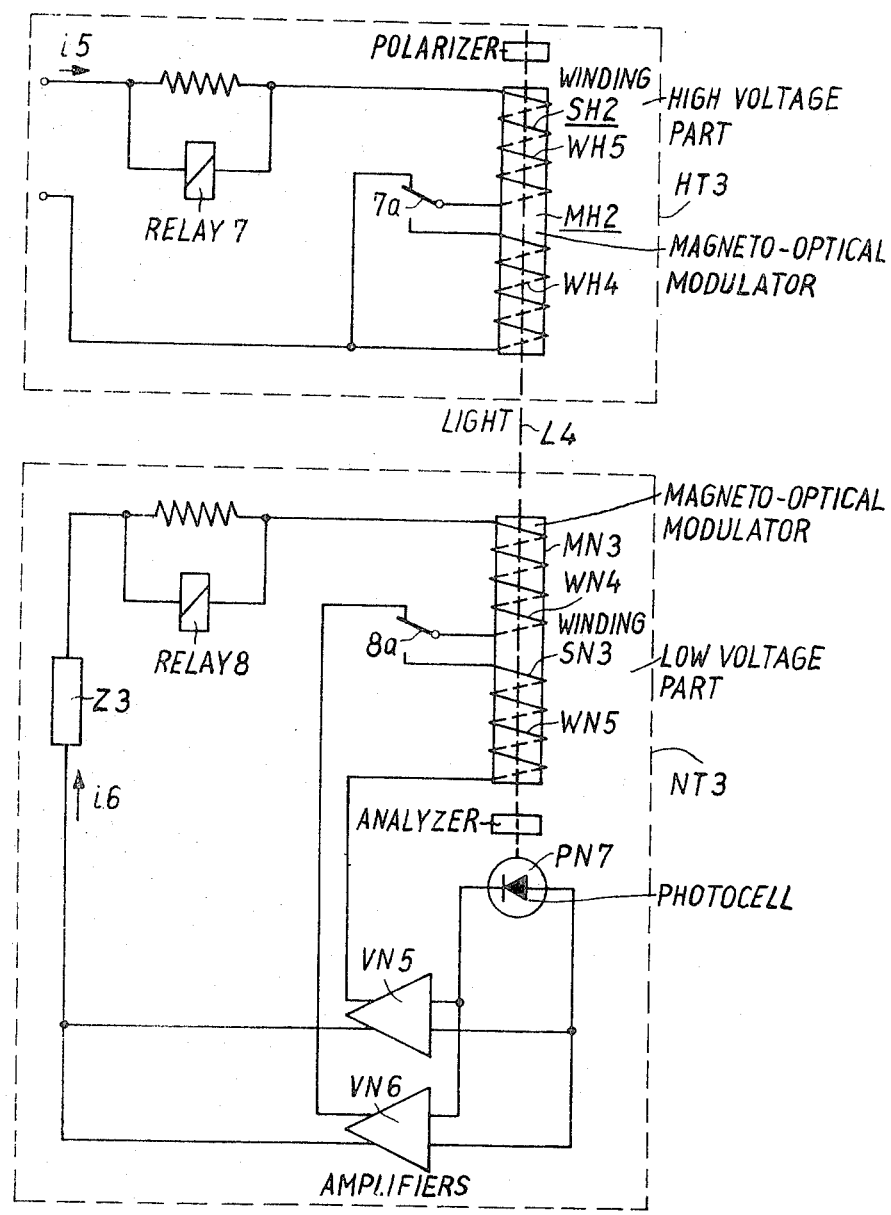
FIG. 3 is a circuit diagram of another embodiment of the measuring device of the invention for currents in high voltage conductors.

FIG. 2 shows another embodiment of the low voltage part NT2 of the measuring device of the invention. The high voltage portion of the embodiment of FIG. 2 is the same as that of the embodiment of FIG. 1 and is therefore not shown in FIG. 2. The low voltage part NT2 includes a magneto-optical modulator MN2 having a core component BN2. The core component BN2 exhibits the Faraday effect and has a field winding SN2 wound around it. The field winding SN2 comprises a plurality of component windings WN1, WN2 and WN3.

The component windings WN1, WN2 and WN3 of the field winding SN2 of the magneto-optical modulator MN2 may be electrically interconnected via relay contacts 5a and 6a of relays 5 and 6, respectively. The relay 5 is connected in a closed loop with a photocell PN4. The relay 6 is connected in a closed loop with a photocell PN5. When the relays 5 and 6 are energized, they move their relay contacts to their positions shown in FIG. 2. When the relays 5 and 6 are deenergized, the relay contacts 5a and 6a are in their positions opposite those shown in FIG. 2. The photocells PN4 and PN5 produce output signals under the stimulus of light transmitted from the high voltage part in the same manner as in the embodiment of FIG. 1.

The additional magneto-optical modulator MN2 supplies the light passing through its core component BN2 to an analyzer AN2. The light from the analyzer AN2 impinges upon a photocell PN6. The photocell PN6 is connected in common to the inputs of a plurality of amplifiers VN2, VN3 and VN4. The output of each of the amplifiers VN2, VN3 and VN4 is connected to a corresponding one of the component windings WN1, WN2 and WN3 of the field winding SN2 of the magneto-optical modulator MN2. Thus, under the control of the relays 5 and 6, which control the positions of their contacts 5a and 6a, respectively, each amplifier provides a current through its corresponding component winding WN1, WN2 or WN3 and through the load Z2, which is connected in common with all of said component windings. Due to the measuring range switch to a high voltage potential, a current $i4$, which is proportional to the current being measured, flows through the load Z2.

Thus, in the embodiment of FIG. 2, the amplifier VN2 provides the output which is required for the series connection of all the component windings of the magneto-optical modulator at high voltage potential and series connection of all the component windings of the additional magneto-optical modulator MN2 at low voltage potential. This provides an inverse rotation of the plane of polarization of the light beam in the additional magneto-optical modulator MN2. The amplifier VN2 thus provides a secondary current $i4$ which is proportional to the current to be measured. The amplifiers VN3 and VN4 provide the secondary currents for the higher measuring ranges.

The provision of a corresponding amplifier for each of the component windings WN1, WN2 and WN3 of the magneto-optical modulator MN2, in the embodiment of FIG. 2, provides the advantage that less is demanded of each amplifier than when only one amplifier is utilized. The amplifier VN2 must have the highest possible accuracy, although the efficiencies present no problem. The amplifiers VN3 and VN4, for the higher current ranges, need not function with such accuracy. They must, however, function with higher efficiency. Thus, each of the amplifiers VN2, VN3 and VN4 must have an optimum rating in one aspect only.

In the embodiment of FIG. 2, all the amplifiers VN2, VN3 and VN4 must be operated together, and the output circuit of each of said amplifiers is closed by the connection of the corresponding one of the component windings WN1, WN2 and WN3. It may be preferred to operate the amplifiers via additional relay contacts, so that only the necessary amplifier will be operated, and the remaining two amplifiers will remain disconnected from the circuit.

The embodiment of FIG. 3 of the measuring device of the invention is particularly suitable in the event that the current to be measured suddenly increases from the lowest measuring range to higher measuring ranges. In the embodiment of FIG. 3, a signal from each switch member in the high voltage portion to the low voltage portion is eliminated.

In the embodiment of FIG. 3, only a single measuring switch is illustrated in the high voltage part HT3, in order to maintain the clarity of illustration. A current relay 7 is connected in the circuit through which a current $i5$, which is proportional to the current to be measured, flows. The relay 7 responds and is energized when the current i5 increases in magnitude above a magnitude representing the lowest measuring range.

When the relay 7 is energized, it moves its contact 7a to its position shown in FIG. 3. When the relay contact 7a is in its positions shown in FIG. 3, it disconnects a component winding WH4 of the field winding SH2 of a magneto-optical modulator MH2 from the remaining component winding WH5 of the field winding SH2 of the magneto-optical modulator MH2 and remains connected in the circuit, thereby adjusting the number of ampere-turns in said magneto-optical modulator to the intensity of the current.

Another current relay 8 is included in the low voltage part NT3, in series connection with a load Z3. The relay 8 responds and is energized when the current being measured increases above the magnitudes of the lowest measuring range. When the current magnitude increases above the lowest measuring range, it operates a photocell PN7 and an amplifier VN5 provides an output signal in accordance with said lowest measuring range. In this case, the series-connected component windings WN4 and WN5 of the field winding SN3 of the additional magneto-optical modulator MN3 at low voltage provide a current i6 having a magnitude which is greater than the magnitude at which the relay 8 is energized.

The relay 8 controls its contact 8a in position. When the relay 8 is energized, its contact 8a is positioned as shown in FIG. 3, and disconnects the component windings WN4 and WN5 from each other, so that the output circuit of the amplifier VN5 is opened. When the relay contact 8a is moved to its position shown in FIG. 3, it closes the output circuit of the amplifier VN6, which amplifier then provides a current through the load Z3 and through the component winding WN4. Thus, the rotation, at high voltage potential, of the plane of polarization of the light beam L4 is canceled in the additional magneto-optical modulator MN3. The current i6 flowing through the load Z3 is thus always proportional to the current being measured at the high voltage part HT3.

In the embodiment of FIG. 3, the relays 7 and 8 do not operate in exact synchronism. The relay 8 of the low voltage part NT3 must be adjusted so that when the current being measured increases above the magnitudes of the lowest measuring range, said relay will be energized shortly prior to the relay 7 of the high voltage part HT3, in order to prevent the indicated current magnitude from becoming too low. Thus, for example, the switchover in the secondary circuit is omitted if the switching in the secondary circuit is provided first.

When the current to be measured decreases in magnitude from magnitudes in the higher measuring range to magnitudes in the lowest measuring range, switching must be provided first in the low voltage part NT3. This may be done when the relay 7 of the high voltage part HT3 is energized at substantially the same current as is the relay 8 of the low voltage part NT3, but is provided, at the same time, with a pull-up and a drop-off time lag.

The aforedescribed embodiments of the invention are basic, and it is understood that their details may be varied in order to improve their operation. It may be preferable, for example, to utilize capacitances in order to avoid voltage peaks. The relays may be replaced by electronic switches, in order to adjust their operation to an optimum relative to the necessary requirements. It may also be feasible to utilize electro-optical modulators to signal the respective measuring range switch to the low voltage part, when electronic switches are utilized as the switching members, in order to provide a measuring range switch. The diaphragms remain in the additional optical conduits or channels.

Light sources at high voltage potential may be utilized to signal the measuring range switch. The light sources are controlled by the switching members and are particularly advantageous for switching members comprising electronic switches.

The invention provides a measuring device for currents in high voltage conductors wherein, in order to provide a wide range of measurement, switching is undertaken by a single measuring system. This permits an expedient elimination of additional measuring systems, as utilized in known measuring devices of similar type, for each measuring range. The measuring device of the invention is thus of relatively simple structure and is therefore economical in production and operation.

While the invention has been described by means of specific examples and in specific embodiments, we do not wish to be limited thereto, for obvious modifications will occur to those skilled in the art without departing from the spirit and scope of the invention.

Magneto-optical modulators are well known and are described, for example, in an article on pages 1,045 to 1,053 of the periodical "Revue Generale De L'Electricite", 1967.

We claim:

1. A measuring device for currents in high voltage conductors, said measuring device comprising
   magneto-optical modulator means positioned at a high voltage conductor for rotating the plane of polarization of light supplied thereto in accordance with the magnitude of a current to be measured flowing in said conductor, said magneto-optical modulator means comprising a core component and a field winding wound around said core component said field winding being energized by the current to be measured thereby; rotating the plane of polarization of light supplied to said core component, said field winding comprising a plurality of component windings for providing a wide range of measurement;
   switching means interconnecting the component windings of the field winding of said magneto-optical modulator means and responsive to the magnitude of the current to be measured to vary the number of said component windings connected in circuit thereby varying the magnetic field produced thereby in the manner of an independent measuring range switch;
   a load; and
   photoelectric evaluating means for converting light passing through the core component of said magneto-optical modulator means into an electrical quantity proportional to the current to be measured, said photoelectric evaluating means including another winding comprising a plurality of component windings for coupling the load to said electrical quantity, said photoelectric evaluating means providing an additional switching means at low voltage potential corresponding to the measuring range switch at high voltage potential, said additional switching means varying the number of component windings coupled to the load.

2. A measuring device as claimed in claim 1, wherein said switching means comprises switching members each having different current sensitivity from the others at high voltage potential, input means for supplying a current proportional to the current to be measured to said switching members and switch contacts interconnecting the component windings of the field winding of said magneto-optical modulator means and controlled in position by said switching members.

3. A measuring device as claimed in claim 1, wherein said, additional switching means comprises switching members each responsive to a different current from the others at low voltage potential, means for supplying a signal proportional to the current to be measured to said switching members and switch contacts interconnecting the component windings of the other winding of said photoelectric evaluating means and controlled in position by said switching members thereby providing a low voltage measuring range switch.

4. A measuring device as claimed in claim 1, wherein said switching means comprises switching members each having different current sensitivity from the others at high voltage potential, input means for supplying a current proportional to the current to be measured to said switching members and switch contacts interconnecting the component windings of the field winding of said magneto-optical modulator means and controlled in position by said switching members, and wherein said additional switching means comprises additional switching members each responsive to a different current from the others at low voltage potential, means for supplying a signal proportional to the current to be measured to said additional switching members and additional switch contacts interconnecting the component windings of the other winding of said photoelectric evaluating means and controlled in position by said additional switching members thereby providing a low voltage measuring range switch.

5. A measuring device as claimed in claim 1, wherein said photoelectric evaluating means comprises additional magneto-optical modulator means at low voltage potential for rotating the plane of polarization of light supplied thereto from said magneto-optical modulator means at high voltage potential to cancel the previous rotation of the plane of polarization thereof.

6. A measuring device as claimed in claim 4, wherein the means for supplying a signal proportional to the current to be measured to said additional switching members comprises a plurality of controllable optical conducting conduits each for a corresponding one of the switch members of said switching means, each of said conducting conduits conducting light from the light supplied to said magneto-optical modulator means to a corresponding one of the additional switching members of said additional switching means thereby electrically controlling the connection of the component windings of the other winding of said photoelectric evaluating means and providing a low voltage measuring range switch corresponding to the high voltage measuring range switch via said additional switching means.

7. A measuring device as claimed in claim 4, wherein the switching members of said switching means and the additional switching members of said additional switching means comprise AC relays each connected in shunt with a resistor connected in circuit with the corresponding component winding.

8. A measuring device as claimed in claim 4, wherein said switching means and said additional switching means comprise electronic switches.

9. A measuring device as claimed in claim 5, wherein said photoelectric evaluating means further comprises amplifier means comprising an amplifier having an input coupled to said additional magneto-optical modulator means and an output and auxiliary transformer means having a primary winding connected to the output of said amplifier and a secondary winding, and wherein the other winding of said photoelectric evaluating means is the secondary winding of said auxiliary transformer means.

10. A measuring device as claimed in claim 5, wherein said additional magneto-optical modulator means comprises a core component and a field winding wound around said core component, wherein the other winding of said photoelectric evaluating means is the field winding of said additional magneto-optical modulator means, and wherein said photoelectric evaluating means further comprises amplifier means comprising a plurality of amplifiers each having an input coupled to said additional magneto-optical modulator means and an output coupled to a corresponding one of the component windings of said other winding.

11. A measuring device as claimed in claim 6, wherein each of said optical conducting conduits comprises a plurality of light conducting fibers for transmitting light and a diaphragm interposed therein and controlled in position by a corresponding one of the switching members of said switching means, and wherein said additional switching means further comprises photocells each positioned at a corresponding one of said conducting conduits and electrically connected to a corresponding one of the additional switching members of said additional switching means whereby each of said photocells controls the operation of a corresponding one of said additional switching members.

12. A measuring device as claimed in claim 6, further comprising optical means for directing light from the light supplied to said magneto-optical modulator means to each of said optical conducting conduits.

13. A measuring device as claimed in claim 7, wherein the switch contacts of said switching means and the additional switch contacts of said additional switching means comprise relay wiper contacts.

* * * * *